United States Patent
Smith et al.

(10) Patent No.: US 10,050,703 B2
(45) Date of Patent: Aug. 14, 2018

(54) MONITORING OPTICAL DECAY IN FIBER CONNECTIVITY SYSTEMS

(71) Applicant: CommScope Technologies LLC, Hickory, NC (US)

(72) Inventors: Trevor D. Smith, Eden Prairie, MN (US); Erik J. Gronvall, Bloomington, MN (US); Timothy G. Badar, Redwood City, CA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/976,056

(22) Filed: Dec. 21, 2015

(65) Prior Publication Data

US 2016/0182148 A1 Jun. 23, 2016

Related U.S. Application Data

(63) Continuation of application No. 13/937,654, filed on Jul. 9, 2013, now Pat. No. 9,219,543.
(Continued)

(51) Int. Cl.
*H04B 10/08* (2006.01)
*H04B 17/00* (2015.01)
(Continued)

(52) U.S. Cl.
CPC ... *H04B 10/0793* (2013.01); *H04B 10/07955* (2013.01); *H04Q 11/0066* (2013.01); *H04Q 2011/0083* (2013.01)

(58) Field of Classification Search
CPC .............. H04B 10/294; H04B 10/2941; H04B 10/2942
(Continued)

(56) References Cited

U.S. PATENT DOCUMENTS

RE26,692 E 10/1969 Ruehlemann
3,954,320 A 5/1976 Hardesty
(Continued)

FOREIGN PATENT DOCUMENTS

DE 10244304 3/2004
DE 10 2004 033 940 2/2006
(Continued)

OTHER PUBLICATIONS

*Avaya's Enhanced Systimax® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.
(Continued)

*Primary Examiner* — David Payne
*Assistant Examiner* — Pranesh Barua
(74) *Attorney, Agent, or Firm* — Merchant & Gould P.C.

(57) ABSTRACT

A tracking system includes a tracking arrangement including a processor, memory, and at least a first interface port; and one or more optical modules. Each optical module includes a housing having at least one input port, at least a first output port, and at least a first monitoring port. An optical power splitter arrangement and an optical receiver are disposed within the housing. The splitter arrangement splits optical signals received at the input port onto one or more output lines and one or more monitoring lines. The output lines are routed to the output ports and the monitoring lines are routed to the optical receiver. The optical receiver measures the power of optical signals received from the first monitoring line and provides a measurement signal to the first monitoring port of the housing.

12 Claims, 5 Drawing Sheets

Related U.S. Application Data

(60) Provisional application No. 61/670,437, filed on Jul. 11, 2012.

(51) Int. Cl.
*H04B 10/079* (2013.01)
*H04Q 11/00* (2006.01)

(58) Field of Classification Search
USPC .................................................. 398/38, 39
See application file for complete search history.

(56) References Cited

U.S. PATENT DOCUMENTS

| | | | |
|---|---|---|---|
| 4,737,120 A | 4/1988 | Grabbe et al. | |
| 4,953,194 A | 8/1990 | Hansen et al. | |
| 4,968,929 A | 11/1990 | Hauck et al. | |
| 5,041,005 A | 8/1991 | McHugh | |
| 5,052,940 A | 10/1991 | Bengal | |
| 5,064,381 A | 11/1991 | Lin | |
| 5,161,988 A | 11/1992 | Krupka | |
| 5,199,895 A | 4/1993 | Chang | |
| 5,222,164 A | 6/1993 | Bass, Sr. et al. | |
| 5,305,405 A | 4/1994 | Emmons et al. | |
| 5,393,249 A | 2/1995 | Morgenstern et al. | |
| 5,394,503 A | 2/1995 | Dietz, Jr. et al. | |
| 5,413,494 A | 5/1995 | Dewey et al. | |
| 5,419,717 A | 5/1995 | Abendschein et al. | |
| 5,467,062 A | 11/1995 | Burroughs et al. | |
| 5,483,467 A | 1/1996 | Krupka et al. | |
| 5,579,425 A | 11/1996 | Lampert et al. | |
| 5,685,741 A | 11/1997 | Dewey et al. | |
| 5,821,510 A | 10/1998 | Cohen et al. | |
| 5,910,776 A | 6/1999 | Black | |
| 6,002,331 A | 12/1999 | Laor | |
| 6,011,623 A * | 1/2000 | MacDonald ............ | H04B 10/07 356/519 |
| 6,116,961 A | 9/2000 | Henneberger et al. | |
| 6,128,111 A * | 10/2000 | Roberts ................ | H04B 10/077 398/1 |
| 6,178,025 B1 * | 1/2001 | Hardcastle ........... | H04B 10/077 370/222 |
| 6,222,908 B1 | 4/2001 | Bartolutti et al. | |
| 6,234,830 B1 | 5/2001 | Ensz et al. | |
| 6,285,293 B1 | 9/2001 | German et al. | |
| 6,300,877 B1 | 10/2001 | Schannach et al. | |
| 6,304,350 B1 * | 10/2001 | Doerr .................. | H04B 10/506 372/23 |
| 6,330,307 B1 | 12/2001 | Bloch et al. | |
| 6,350,148 B1 | 2/2002 | Bartolutti et al. | |
| 6,409,392 B1 | 6/2002 | Lampert et al. | |
| 6,424,710 B1 | 7/2002 | Bartolutti et al. | |
| 6,437,894 B1 | 8/2002 | Gilbert et al. | |
| 6,456,768 B1 | 9/2002 | Boncek et al. | |
| 6,499,861 B1 | 12/2002 | German et al. | |
| 6,511,231 B2 | 1/2003 | Lampert et al. | |
| 6,522,737 B1 | 2/2003 | Bartolutti et al. | |
| 6,571,038 B1 * | 5/2003 | Joyner ................. | G02B 6/2813 385/27 |
| 6,574,586 B1 | 6/2003 | David et al. | |
| 6,594,046 B1 * | 7/2003 | Nishino ............. | H04B 10/2941 359/239 |
| 6,636,152 B2 | 10/2003 | Schannach et al. | |
| 6,725,177 B2 | 4/2004 | David et al. | |
| 6,743,044 B2 | 6/2004 | Musolf et al. | |
| 6,744,964 B1 * | 6/2004 | Vittal ................. | H04B 10/25073 385/140 |
| 6,802,735 B2 * | 10/2004 | Pepe .................... | H01R 24/64 439/395 |
| 6,808,116 B1 | 10/2004 | Eslambolchi et al. | |
| 6,839,523 B1 * | 1/2005 | Roberts ............. | H04B 10/0797 359/333 |
| 6,898,368 B2 | 5/2005 | Colombo et al. | |
| 6,905,363 B2 | 6/2005 | Musolf et al. | |
| 6,932,517 B2 | 8/2005 | Swayze et al. | |
| 6,971,895 B2 | 12/2005 | Sago et al. | |
| 7,081,808 B2 | 7/2006 | Colombo et al. | |
| 7,088,880 B1 | 8/2006 | Gershman | |
| 7,123,810 B2 | 10/2006 | Parrish | |
| 7,153,142 B2 | 12/2006 | Shifris et al. | |
| 7,165,728 B2 | 1/2007 | Durrant et al. | |
| 7,193,422 B2 | 3/2007 | Velleca et al. | |
| 7,210,858 B2 | 5/2007 | Sago et al. | |
| 7,215,883 B1 * | 5/2007 | Lewis ................. | H04B 10/077 398/17 |
| 7,218,828 B2 * | 5/2007 | Feustel .............. | G02B 6/2804 385/134 |
| 7,226,217 B1 | 6/2007 | Benton et al. | |
| 7,234,944 B2 | 6/2007 | Nordin et al. | |
| 7,297,018 B2 | 11/2007 | Caveney et al. | |
| 7,315,224 B2 | 1/2008 | Gurovich et al. | |
| 7,352,289 B1 | 4/2008 | Harris | |
| 7,356,208 B2 | 4/2008 | Becker | |
| 7,394,983 B2 * | 7/2008 | Lee ....................... | G02B 6/359 398/45 |
| 7,458,517 B2 | 12/2008 | Durrant et al. | |
| 7,519,000 B2 | 4/2009 | Caveney et al. | |
| 7,552,872 B2 | 6/2009 | Tokita et al. | |
| 7,620,327 B2 * | 11/2009 | Snawerdt ............ | H04B 10/071 398/135 |
| 7,869,426 B2 | 1/2011 | Hough et al. | |
| 7,872,738 B2 | 1/2011 | Abbott | |
| 8,423,809 B2 * | 4/2013 | Ushigami ............ | G06F 1/266 713/320 |
| 8,532,490 B2 * | 9/2013 | Smith ................ | H04B 10/25754 398/115 |
| 9,219,543 B2 | 12/2015 | Smith et al. | |
| 2002/0081076 A1 | 6/2002 | Lampert et al. | |
| 2004/0052471 A1 | 3/2004 | Colombo et al. | |
| 2004/0101233 A1 * | 5/2004 | Lee ....................... | G02B 6/359 385/16 |
| 2004/0117515 A1 | 6/2004 | Sago et al. | |
| 2004/0208535 A1 * | 10/2004 | Bragg ................. | H04J 14/0221 398/38 |
| 2004/0240807 A1 | 12/2004 | Frohlich et al. | |
| 2005/0174563 A1 * | 8/2005 | Evans ................. | H04B 10/071 356/73.1 |
| 2005/0249477 A1 | 11/2005 | Parrish | |
| 2006/0160395 A1 | 7/2006 | Macauley et al. | |
| 2006/0193591 A1 | 8/2006 | Rapp et al. | |
| 2006/0228086 A1 | 10/2006 | Holmberg et al. | |
| 2007/0071451 A1 * | 3/2007 | Schatz ................. | H04B 10/66 398/162 |
| 2007/0116411 A1 | 5/2007 | Benton et al. | |
| 2007/0133990 A1 * | 6/2007 | Kim ...................... | B82Y 20/00 398/72 |
| 2007/0183776 A1 * | 8/2007 | Stuart ............... | H04B 10/07955 398/38 |
| 2007/0201867 A1 * | 8/2007 | DeLew ............ | H04B 10/07955 398/38 |
| 2007/0237470 A1 | 10/2007 | Aronson et al. | |
| 2007/0280684 A1 * | 12/2007 | Onoda .................. | H04B 10/03 398/38 |
| 2008/0080867 A1 * | 4/2008 | Itoh ..................... | H04J 14/0221 398/97 |
| 2008/0090450 A1 | 4/2008 | Harano et al. | |
| 2008/0100456 A1 | 5/2008 | Downie et al. | |
| 2008/0100467 A1 | 5/2008 | Downie et al. | |
| 2008/0175532 A1 | 7/2008 | Ruckstuhl et al. | |
| 2008/0175550 A1 | 7/2008 | Coburn et al. | |
| 2008/0239295 A1 * | 10/2008 | Xia ...................... | G01M 11/088 356/73.1 |
| 2008/0292312 A1 * | 11/2008 | Oron ................... | H04B 10/0795 398/33 |
| 2008/0304824 A1 * | 12/2008 | Barbieri ............ | H04B 10/0793 398/38 |
| 2009/0034911 A1 | 2/2009 | Murano | |
| 2009/0129773 A1 * | 5/2009 | Oron ................... | H04B 10/0793 398/10 |
| 2009/0142052 A1 * | 6/2009 | Pegg ................... | H04B 10/077 398/26 |

(56) References Cited

U.S. PATENT DOCUMENTS

| | | | | |
|---|---|---|---|---|
| 2009/0196607 | A1* | 8/2009 | Kai | H04J 14/0221 398/45 |
| 2009/0269054 | A1* | 10/2009 | Smith | H04B 10/073 398/25 |
| 2010/0149521 | A1* | 6/2010 | Yang | G01M 11/332 356/73.1 |
| 2010/0211664 | A1 | 8/2010 | Raza et al. | |
| 2010/0211665 | A1 | 8/2010 | Raza et al. | |
| 2010/0211697 | A1 | 8/2010 | Raza et al. | |
| 2010/0215049 | A1 | 8/2010 | Raza et al. | |
| 2010/0221000 | A1* | 9/2010 | Yang | H04B 10/03 398/38 |
| 2010/0303421 | A1 | 12/2010 | He et al. | |
| 2010/0303465 | A1* | 12/2010 | Dahlfort | G02B 6/4201 398/115 |
| 2010/0322622 | A1* | 12/2010 | Shukunami | H04B 10/07953 398/26 |
| 2011/0092100 | A1* | 4/2011 | Coffey | H01R 13/641 439/620.22 |
| 2011/0262077 | A1* | 10/2011 | Anderson | G02B 6/3825 385/78 |
| 2011/0311226 | A1* | 12/2011 | Smith | G02B 6/483 398/45 |
| 2012/0045201 | A1* | 2/2012 | Skubic | H04B 10/272 398/38 |
| 2012/0082458 | A1* | 4/2012 | Bouda | H04J 14/02 398/69 |
| 2012/0141125 | A1* | 6/2012 | Martin, Jr. | H04J 14/0204 398/45 |
| 2012/0141140 | A1* | 6/2012 | Neilson | H04B 10/61 398/171 |
| 2012/0163800 | A1* | 6/2012 | Urban | H04B 10/071 398/12 |
| 2012/0163809 | A1* | 6/2012 | Sugawa | H04B 10/272 398/34 |
| 2012/0208401 | A1 | 8/2012 | Petersen | |
| 2012/0218625 | A1* | 8/2012 | Mino | H04J 14/0221 359/334 |
| 2012/0219289 | A1* | 8/2012 | Hayashi | H04B 10/07955 398/34 |
| 2013/0004172 | A1* | 1/2013 | Sugawa | H04J 3/1694 398/72 |
| 2013/0216187 | A1* | 8/2013 | Dowling | H04Q 11/0003 385/71 |
| 2013/0286847 | A1* | 10/2013 | Schmidt | H04J 14/0258 370/241 |

FOREIGN PATENT DOCUMENTS

| | | |
|---|---|---|
| EP | 1199586 | 4/2002 |
| EP | 1237024 | 9/2002 |
| EP | 1467232 | 10/2004 |
| EP | 1662287 | 5/2006 |
| WO | WO 2007/061490 | 5/2007 |
| WO | WO 2010/001400 | 1/2010 |
| WO | WO 2010/121639 | 10/2010 |

OTHER PUBLICATIONS

*Avaya's Enhanced Systimax® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

*Intelligent patching systems carving out a 'large' niche*, Cabling Installation & Maintenance, vol. 12, Issue 7, Jul. 2004 (5 pages).

*IntelliMAC: The intelligent way to make Moves, Adds or Changes!* NORDX/CDT ©2003 (6 pages).

International Search Report and Written Opinion dated May 23, 2011 in related Application No. PCT/US2011/024650 (17 pages).

International Search Report and Written Opinion dated Sep. 12, 2011 in related Application No. PCT/US2011/024652 (28 pages).

International Search Report and Written Opinion dated Sep. 19, 2011 in related Application No. PCT/US2011/024649 (27 pages).

International Search Report and Written Opinion dated Sep. 22, 2011 in related Application No. PCT/US2011/024653 (25 pages).

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

Partial International Search Report and Invitation to Pay Additional Fees dated May 19, 2011 in related Application No. PCT/US2011/024653 (6 pages).

Partial International Search and Invitation to Pay Additional Fees dated Jun. 8, 2011 in related Application No. PCT/US2011/024649 (8 pages).

Partial International Search and Invitation to Pay Additional Fees dated Jun. 16, 2011 in related Application No. PCT/US2011/024652 (9 pages).

*Systimax® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

\* cited by examiner

MONITORING OPTICAL DECAY IN FIBER CONNECTIVITY SYSTEMS

CROSS-REFERENCE TO RELATED APPLICATIONS

This application is a continuation of application Ser. No. 13/937,654, filed Jul. 9, 2013, now U.S. Pat. No. 9,219,543, which application claims the benefit of provisional application Ser. No. 61/670,437, filed Jul. 11, 2012, which applications are incorporated herein by reference in their entirety.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to optical modules that provide physical layer management capabilities. In accordance with certain aspects, the optical modules are configured to monitor the power of the signals received at the optical module. For example, the optical module may be configured to periodically or intermittently measure the power of the received signal and to report the measured power to a tracking system.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
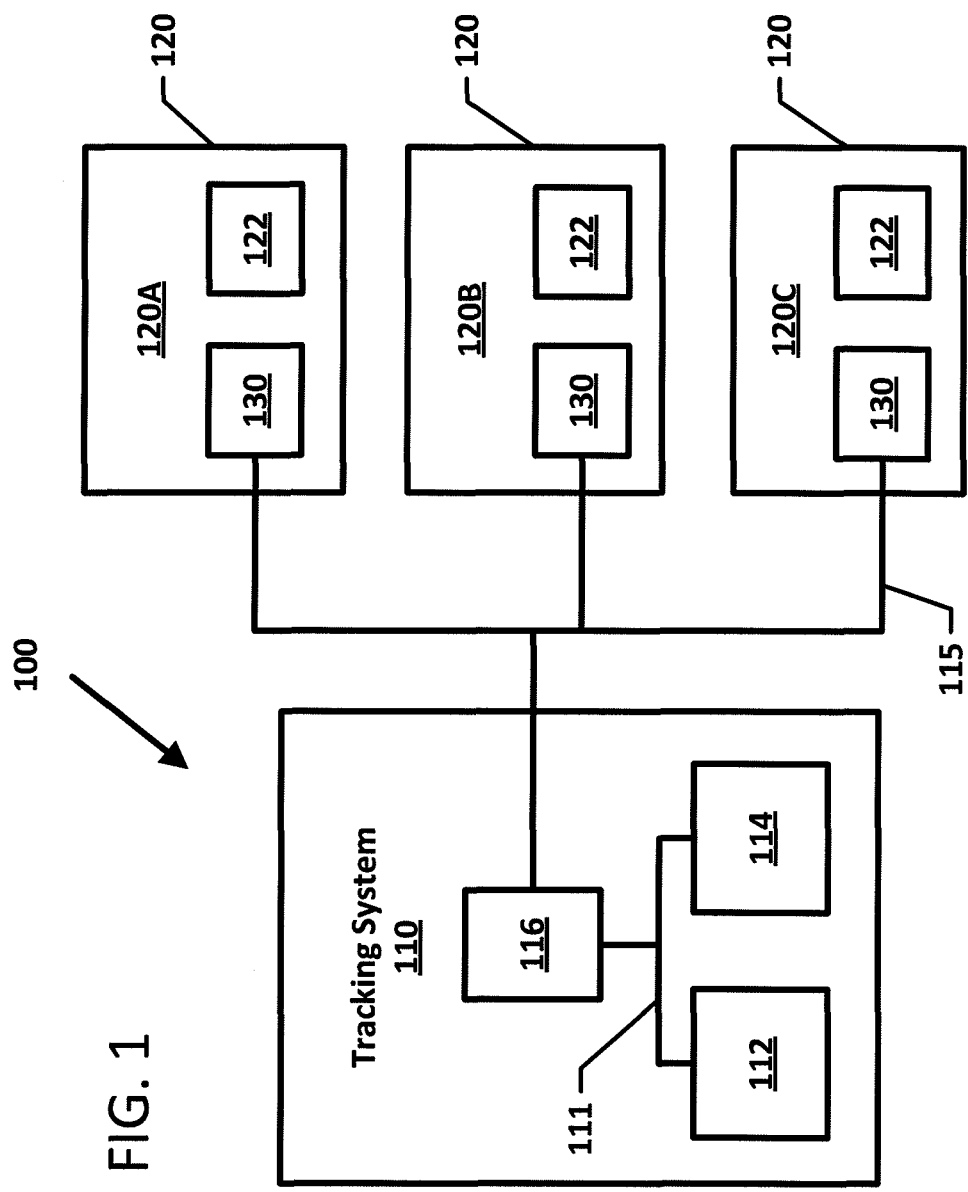
FIG. 1 is a schematic block diagram of an example tracking system including a tracking arrangement for monitoring signal strength at multiple optical modules.

FIG. 1 illustrates a power monitoring system 100 including a tracking arrangement 110 and a plurality of optical modules 120. In some implementations, the tracking arrangement 110 services only one of the optical modules 120. In other implementations, the tracking arrangement 110 services multiple optical modules 120. In the example shown, the tracking arrangement 110 services a first optical module 120A, a second optical module 120B, and a third optical module 120C. In other implementation, however, the tracking arrangement 110 may service a greater or lesser number of optical modules 120.

The tracking arrangement 110 includes at least one processor 112, at least one memory storage 114, and at least one port interface 116. In some implementations, the processor 112, memory 114, and port interfaces 116 are connected by circuitry (e.g., a bus) 111. In certain implementations, the tracking arrangement 110 is implemented using a single device (e.g., such as a computer). In other implementations, the tracking arrangement 110 is implemented using multiple computers (e.g., a computer network).

The port interface 116 is configured to receive a power reading from one or more optical modules 120. In some implementations, the port interface 116 receives a wired connection from one or more of the optical modules 120. In other implementations, the port interface 116 receives a wireless connection from one or more of the optical modules 120. In still other implementations, the tracking arrangement 110 may be part of the same device or equipment as the optical module 120.

The memory 114 can be configured to store the power readings received from the optical modules 120. The processor 112 of the tracking arrangement 110 is configured to analyze the power readings received from the optical modules 120. For example, in certain implementations, the processor 112 can compare a plurality of power readings taken from the same optical module 120 over time to determine a rate of decay for the optical module 120. In other implementations, the processor 112 can compare new power readings with predetermined thresholds to detect significant power losses.

In some implementations, each optical module 120 includes a coupler arrangement 122 and an optical receiver 130. The coupler arrangement 122 is configured to receive optical power signals (e.g., from an optical network) and to allow the optical signals to propagate to outgoing optical fibers or to output ports of the optical module 120. The outgoing optical signals may be directed from the optical module 120 to optical equipment or to another part of the optical network.

The optical receiver 130 is configured to measure the strength (e.g., power) of the optical signals propagating through the coupler arrangement 122. In certain implementations, the optical receiver 130 is a photo detector.

Figure 2:
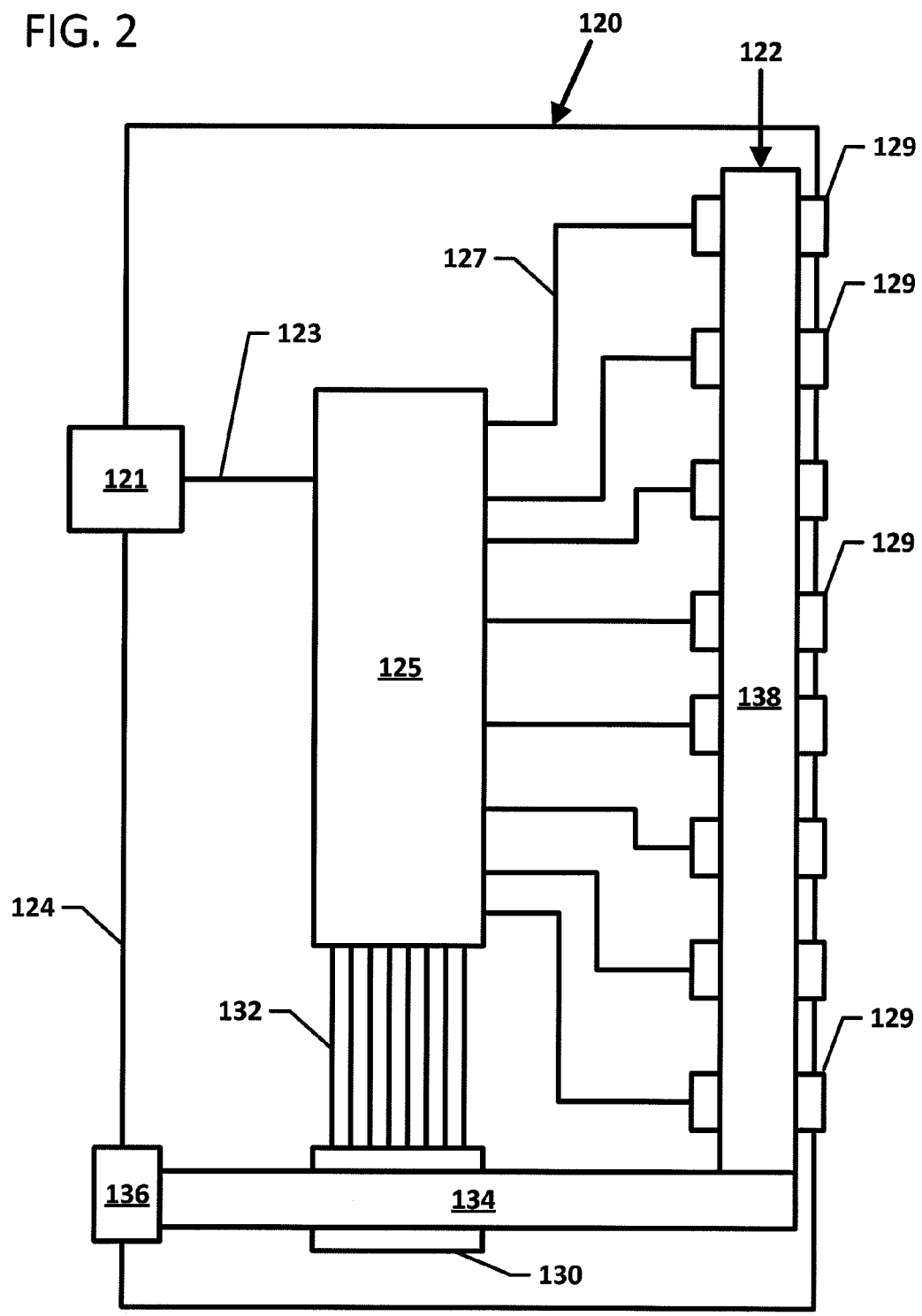
FIG. 2 is a schematic block diagram of an example optical module suitable for use in the tracking system of FIG. 1.

FIG. 2 is a schematic block diagram of one example optical module 120 including a housing 124 having at least one input port 121 and at least one output port arrangement 129. The optical receiver 130 is disposed within the housing 124. The optical module 120 also includes an optical power splitter 125 that receives an input line 123 from the input port 121. At least one output line 127 and at least one monitor line 132 extend outwardly from the power splitter 125. Each output line 127 extends between the power splitter 125 and an output port arrangement 129. Each monitor line 132 extends between the power splitter 135 and the optical receiver 130.

The power splitter 125 splits each optical signal received at the input port 121 onto the output line 127 and the monitor line 132. In some implementations, the power splitter 125 splits the optical signals so that at least 80% of the optical signal propagates to the output line 127 and no more than 20% of the optical signal propagates to the monitor line 132. In certain implementations, the power splitter 125 splits the optical signals so that at least 90% of the optical signal propagates to the output line 127 and no more than 10% of the optical signal propagates to the monitor line 132. In certain implementations, about 95% of the optical signal is split onto the output line 127 and about 5% of the optical signal is split onto the monitor line 132. In certain implementations, about 98% of the optical signal is split onto the output line 127 and about 2% of the optical signal is split onto the monitor line 132. Accordingly, a majority of the optical signal power is retained within the optical network.

In some implementations, multiple output lines 127 and multiple monitor lines 132 extend outwardly from the power splitter 125. In the example shown, eight output lines 127 and eight monitor lines 132 extend outwardly from the power splitter 125. In other implementations, a greater or lesser number of output lines 127 and/or monitor lines 132 may extend outwardly from the power splitter 125. In still other implementations, a first power splitter splits a small percentage of the optical signal onto a monitor line 132 and a second power splitter splits the rest of the optical signal onto output lines 127. In still other implementations, a first power splitter splits the optical signal onto multiple input lines directed to additional power splitters. The additional power splitters each split a small percentage of the signals received at the respective input line onto a respective monitor line 132 and direct the rest of the signal onto a respective output line 127.

The optical receiver 130 is coupled to a monitor port 136 that is connected to the port interface 116 of the tracking arrangement 110. In some implementations, the optical receiver 130 is coupled to a printed circuit board 134 having electronic circuitry that connects the optical receiver 130 to the monitor port 136. In certain implementations, electrical power can be provided to the optical receiver 130 from a power source (e.g., a wall outlet, a battery, etc.) through the monitor port 136. For example, electrical power signals can be provided to the monitor port 136 and directed over the circuit board 134 to the optical receiver 130. In other implementations, electrical power signals can be directed to the optical receiver 130 through a separate electrical power port.

In some implementations, the tracking arrangement 110 forms part of a data management system that monitors other types of information pertaining to the optical system. For example, certain types of data management systems track physical layer information pertaining to the optical system. In some implementations, one or more optical connectors that are configured to plug into the output port arrangements 129 store physical layer information. This information may be obtained from the optical connectors when they are plugged into the output port arrangements 129 and the information may be directed to the data management network via the monitor port 136.

In the example shown, a second printed circuit board 138 extends across one or more of the output port arrangements 129 to collect information from the optical connectors plugged therein. The second circuit board 138 is electronically coupled (e.g., via wires, a pin connector, an edge-connector, etc.) to the first circuit board 134 to connect the port arrangements 129 to the monitor port 136. In other implementations, the first and second circuit boards 134, 138 form two sections of a single circuit board. In still other implementations, the second circuit board 138 is wired to the optical receiver 130 and/or the monitor port 136.

Figure 3:
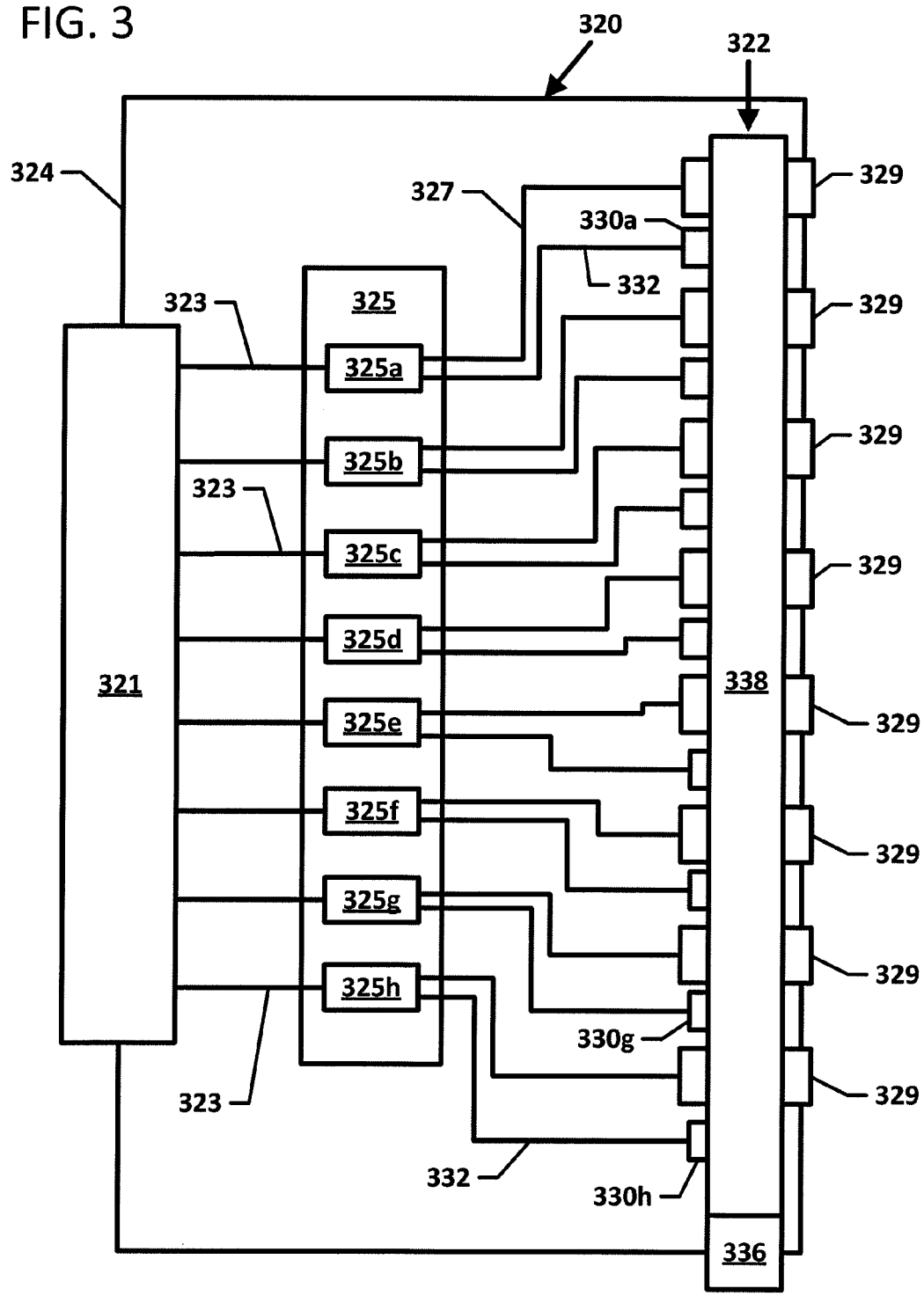
FIG. 3 is a schematic block diagram of another example optical module suitable for use in the tracking system of FIG. 1.

FIG. 3 is a schematic block diagram of another example optical module 320 including a housing 324 having at least one input port 321 and at least one output port arrangement 329. One or more optical receivers 330 are disposed within the housing 324. The optical module 320 also includes an optical power splitter arrangement 325 that receives input lines 323 from the input port 321. In certain implementations, multiple input lines 323 extend from one input port 321. For example, the port 321 may be configured to receive an MPO-type connector terminating multiple optical fibers. In the example shown, eight input lines 323 extend from a single port 321. In other implementations, a greater or lesser number of input lines 323 may extend from a greater or lesser number of ports 321.

At least one output line 327 and at least one monitor line 332 extend outwardly from the power splitter arrangement 325. Each output line 327 extends between the power splitter arrangement 325 and an output port arrangement 329. In some implementations, the number of output lines 327 is equal to the number of input lines 323. In other implementations, the number of output lines 327 may be greater than the number of input lines 323. For example, signal carried on the input lines 323 may be split onto two or more output lines 327. In the example shown, eight output lines 327 extend from the splitter arrangement 325 to single optical connectors and/or adapter ports.

Each monitor line 332 extends between the power splitter arrangement 325 and one of the optical receivers 330. In some implementations, each of the monitor lines 332 extends to a common optical receiver 330. In certain implementations, only some of the monitor lines 332 extend to a common optical receiver 330. In other implementations, each of the monitor lines 332 extends to a separate optical receiver 330a-330h.

The power splitter arrangement 325 splits each optical signal received at the input port 321 onto the output line 327 and the monitor line 332. In some implementations, the power splitter arrangement 325 includes a splitter chip holding multiple splitters. In the example shown, the power splitter arrangement 325 holds eight splitters 325a-325h that each split signals carried over one of the input lines 323 onto one of the output lines 327 and one of the monitor lines 332. In other implementations, each splitter may split the signal onto multiple output lines 327 in addition to the monitor line 323. In still other implementations, the splitter arrangement 325 may split signals carried on only some of the input lines 323.

In some implementations, the power splitter 325 splits the optical signals so that at least 50% of the optical signal propagates to the output line 327 and no more than 50% of the optical signal propagates to the monitor line 332. In certain implementations, the power splitter 325 splits the optical signals so that at least 80% of the optical signal propagates to the output line 327 and no more than 20% of the optical signal propagates to the monitor line 332. In certain implementations, the power splitter 325 splits the optical signals so that at least 90% of the optical signal propagates to the output line 327 and no more than 10% of the optical signal propagates to the monitor line 332. In certain implementations, about 95% of the optical signal is split onto the output line 327 and about 5% of the optical signal is split onto the monitor line 332. In certain implementations, about 98% of the optical signal is split onto the output line 327 and about 2% of the optical signal is split onto the monitor line 332. Accordingly, a majority of the optical signal power is retained within the optical network.

Each of the optical receivers 330 are coupled to one or more monitor ports 336 that connect to the port interface 116 of the tracking arrangement 110. In some implementations, the optical receivers 330 is coupled to a printed circuit board 338 having electronic circuitry that connects the optical receivers 330 to the monitor ports 336. In the example shown, eight optical receivers 330 are electrically connected to a common circuit board 338, which carries signals between the optical receivers 330 and the monitor port 336. In other implementations, each optical receiver 330 may be associated with a unique monitor port 336 via one or more circuit boards. In still other implementations, groups of optical receivers 330 may be associated with common monitor ports 336 via one or more circuit boards. In still other implementations, the optical receivers 330 may be wired to the ports 336 without using circuit boards.

In certain implementations, electrical power can be provided to the optical receivers 330 from a power source (e.g., a wall outlet, a battery, etc.) through the monitor ports 336. For example, in FIG. 3, electrical power signals can be provided to the monitor port 336 and directed over the circuit board 338 to the optical receivers 330. In other implementations, electrical power signals can be directed to the optical receivers 330 through one or more separate electrical power ports.

In implementations where the tracking arrangement 110 forms part of a data management system, the circuit board 338 may communicate with storage devices on the optical connectors (e.g., via readers) to obtain physical layer information or other information from the optical connectors when they are plugged into the output port arrangements 329. The information obtained from the storage devices may be directed to the data management network via the monitor port 336.

In accordance with some aspects of the disclosure, an example communications and data management system includes at least part of a communications network along which communications signals pass. Optical fibers connect equipment of the communications network. In other implementations, the communications network may connect other types of media segments including electrical cables and hybrid cables. Such media segments may be terminated with electrical plugs, electrical jacks, media converters, or other termination components.

In accordance with aspects of the disclosure, the communications and data management system provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the system. As the term is used herein, "PLM functionality" refers to the ability of a component or system to manipulate or to enable others to manipulate the physical components used to implement the physical layer of the system (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications system. Physical layer information of the communications system can include media information, device information, and location information. Media information refers to physical layer information pertaining to cables, plugs, connectors, and other such physical media. Non-limiting examples of media information include a part number, a serial number, a plug type, a conductor type, a cable length, cable polarity, a cable pass-through capacity, a date of manufacture, a manufacturing lot number, the color or shape of the plug connector, an insertion count, and testing or performance information. Device information refers to physical layer information pertaining to the communications panels, inter-networking devices, media converters, computers, servers, wall outlets, and other physical communications devices to which the media segments attach. Location information refers to physical layer information pertaining to a physical layout of a building or buildings in which the network is deployed.

In accordance with some aspects, one or more of the components (e.g., media segments, equipment, etc.) of the communications network are configured to store physical layer information pertaining to the component as will be disclosed in more detail herein. Some components include media reading interfaces that are configured to read stored physical layer information from the components. The physical layer information obtained by the media reading interface may be communicated over the network for processing and/or storage.

Figure 4:
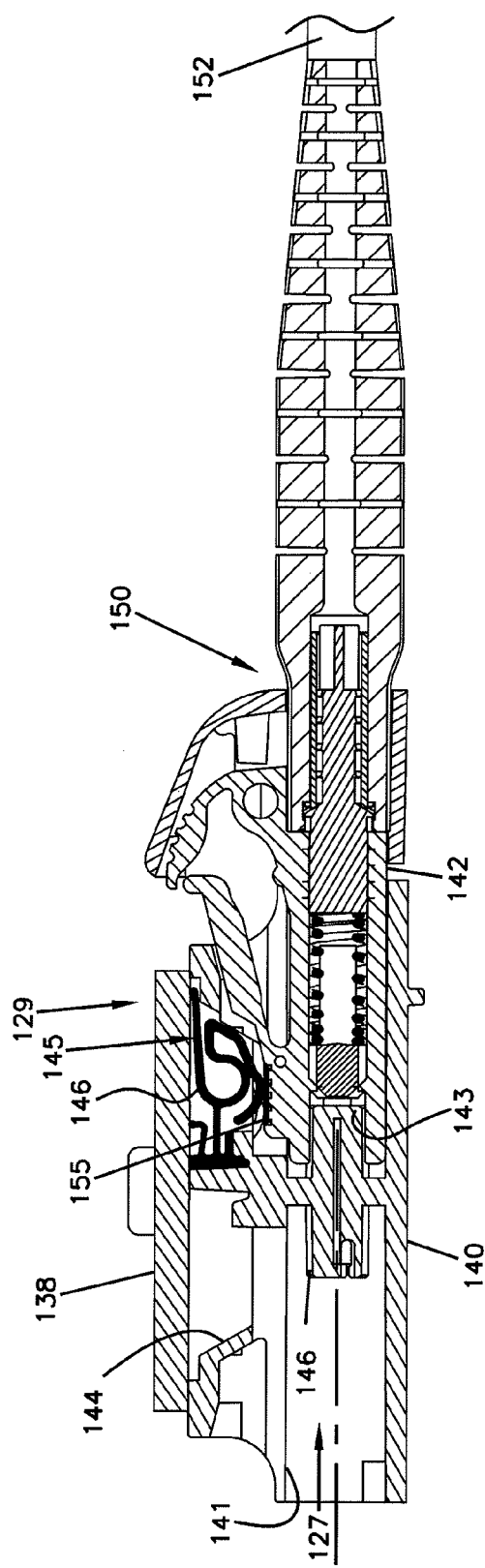
FIG. 4 is a cross-sectional view of an optical adapter including a media reading interface and a printed circuit board suitable for use in the optical modules of FIGS. 2 and 3.

FIG. 4 is a schematic diagram of one example output port arrangement 129, 329 configured to collect physical layer information from an optical connector terminating an optical fiber. The output port arrangements 129, 329 are implemented using one or more optical adapters 140 that each define at least one passage extending between a first port end 141 and a second port end 142. A sleeve (e.g., a split sleeve) 143 is arranged within the adapter 140 between the first and second port ends 141, 142. Each port end 142, 142 is configured to receive an optical connector (e.g., an LC-type connector, an SC-type connector, an LX.5-type connector, an ST-type connector, and FC-type connector, an MPO-type connector, etc.) as will be described in more detail herein.

FIG. 4 schematically shows the output line 127, 327 routed to the adapter 140 and optically coupled to any connector loaded at the second port 142. For example, the output line 127, 327 may include an optical fiber terminated at an optical connector that is plugged into the first adapter port 141. In other implementations, the output line 127, 327 is otherwise optically coupled to the second port 142. The second port 142 is accessible from an exterior of the optical module 120. In the example shown, the second port 142 receives a connector (e.g., an LC-type connector) 150 terminating an optical fiber 152. The sleeve 143 aligns the ferrule of the connector 150 so that optical signals from the output line 127, 327 propagate to the optical fiber 152.

In some implementations, the optical connector 150 may include a storage device 155 that is configured to store physical layer information (e.g., an identifier and/or attribute information) pertaining to the connector 150 and/or the optical fiber cable 152 terminated thereby). In some implementations, a second optical connector terminating the output line 127, 327 also includes a storage device that is configured to store information (e.g., an identifier and/or attribute information) pertaining to the second connector and/or the output line 127, 327. In one implementation, the storage device 155 is implemented using an EEPROM (e.g., a PCB surface-mount EEPROM). In other implementations, the storage device 155 is implemented using other non-volatile memory device. The storage device 155 is arranged and configured so that it does not interfere or interact with the communications signals communicated over the output line 127, 327 and optical fiber 152.

In accordance with some aspects, the adapter 140 is coupled to at least a first media reading interface 145. In certain implementations, the adapter 140 also is coupled to at least a second media interface. In some implementations, the adapter 140 is coupled to more than two media reading interfaces. In certain implementations, the adapter 140 includes a media reading interface for each port end 141, 142 defined by the adapter 140. In other implementations, the adapter 140 includes a media reading interface for each passageway defined by the adapter 140. In still other implementations, the adapter 140 includes a media reading interface 145 for only some of the passageways and/or ports 141, 142.

In some implementations, each media reading interface 145 includes one or more electrical contacts 146. In certain implementations, the storage device 155 and the media reading interface 145 each include three (3) leads/contacts 146—a power lead, a ground lead, and a data lead. The three leads 146 of the storage device 155 come into electrical contact with three (3) corresponding leads 146 of the media reading interface 145 when the corresponding optical connector is inserted in the corresponding port 141, 142. In certain example implementations, a two-line interface is used with a simple charge pump. In still other implementations, additional leads 146 can be provided (e.g., for potential future applications). Accordingly, the storage device 155 and the media reading interface 145 may each include four (4) leads, five (5) leads, six (6) leads, etc.

In some implementations, at least the first media reading interface 145 is mounted to a printed circuit board 138, 338. In the example shown, the first media reading interface 145 of the printed circuit board 138, 338 is associated with the second port end 142 of the adapter 140. In some implementations, the adapter 140 defines one or more slots 143 in which contacts 146 of the first media reading interface 145 are disposed. In some implementations, each contact 146 is disposed in a separate slot 144. In other implementations, the contacts 146 of a single media reading interface 145 are disposed in the same slot 144. The slot 144 extends through a wall of the adapter 140 to connect the second port 142 to the circuit board 138 mounted to the adapter 140. In some implementations, the printed circuit board 138 also can include a second media reading interface (not shown) disposed in one or more slots associated with the first port end 141 of the adapter 140.

The printed circuit board 138, 338 can be communicatively connected to one or more programmable processors and/or to one or more network interfaces. The network interface may be configured to send the physical layer information to a physical layer management network (e.g., see IP network 218 of FIG. 5). In one implementation, one or more such processors and interfaces can be arranged as components on the printed circuit board 138, 338. In another implementation, one or more such processor and interfaces can be arranged on separate circuit boards that are coupled together. For example, the printed circuit board 138, 338 can couple to other circuit boards via a card edge type connection, a connector-to-connector type connection, a cable connection, etc.

When the optical connector 150 is received in the second port end 142 of the adapter 140, the first media reading interface 145 enables reading (e.g., by the processor) of information stored in the storage device 155. The information read from the optical connector 150 can be transferred through the printed circuit board 138, 338 to a physical layer management network, e.g., network 218 of FIG. 5, etc.

Figure 5:
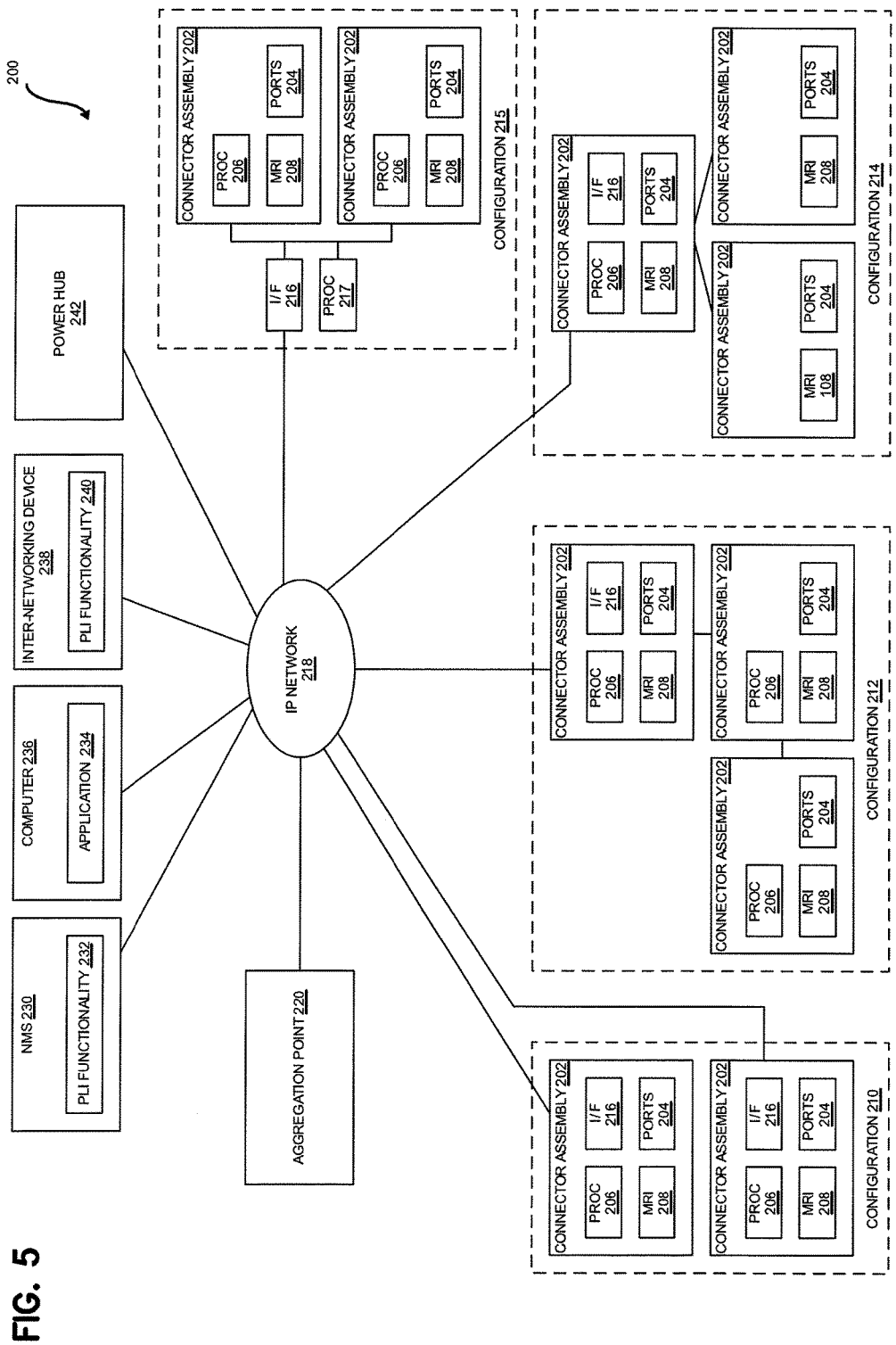
FIG. 5 is a block diagram of one embodiment of a communications management system that includes PLI functionality as well as PLM functionality in accordance with aspects of the present disclosure.

FIG. 5 is a block diagram of one example implementation of a communications management system 200 that includes PLI functionality as well as PLM functionality. The management system 200 comprises a plurality of connector assemblies 202 (e.g., patch panels, blades, optical adapters, electrical jacks, media converters, transceivers, etc.), connected to an IP network 218. Each connector assembly 202 includes one or more ports 204, each of which is configured to receive a media segment for connection to other media segments or equipment of the management system 200. For the purposes of this disclosure, the connector assemblies 202 include adapters 140 defining output port arrangements 129 described above. In other implementations, however, electrical connector assemblies and media segments may be used.

At least some of the connector assemblies 202 are designed for use with optical cables that have physical layer information stored in or on them. The physical layer information is configured to be read by a programmable processor 206 associated with one or more connector assemblies 202. In general, the programmable processor 206 communicates with memory of an optical cable using a media reading interface 208. In some implementations, each of the ports 204 of the connector assemblies 202 includes a respective media reading interface 208. In other implementations, a single media reading interface 208 may correspond to two or more ports 204.

In FIG. 5, four example types of connector assembly configurations 210, 212, 214, and 215 are shown. In the first connector assembly configuration 210, each connector assembly 202 includes its own respective programmable processor 206 and its own respective network interface 216 that is used to communicatively couple that connector assembly 202 to an Internet Protocol (IP) network 218. In the second type of connector assembly configuration 212, connector assemblies 202 are grouped together in proximity to each other (e.g., in a rack, rack system, patch panel, chassis, or equipment closet). Each connector assembly 202 of the group includes its own respective programmable processor 206. However, not all of the connector assemblies 202 include their own respective network interfaces 216.

In the third type of connector assembly configuration 214, some of the connector assemblies 202 (e.g., "masters") in the group include their own programmable processors 206 and network interfaces 216, while others of the connector assemblies 202 (e.g., slaves") do not include their own programmable processors 206 or network interfaces 216. Each programmable processor 206 is able to carry out the PLM functions for both the connector assembly 202 of which it is a part and any of the slave connector assemblies 202 to which the master connector assembly 202 is connected via the local connections.

In the fourth type of connector assembly configuration 215, each of the connector assemblies 202 in a group includes its own "slave" programmable processors 206. Each slave programmable processor 206 is configured to manage the media reading interfaces 208 to determine if physical communication media segments are attached to the port 204 and to read the physical layer information stored in or on the attached physical communication media segments (if the attached segments have such information stored therein or thereon). Each of the slave programmable processors 206 in the group also is communicatively coupled to a common "master" programmable processor 217. The master processor 217 communicates the physical layer information read from by the slave processors 206 to devices that are coupled to the IP network 218. For example, the master programmable processor 217 may be coupled to a network interface 216 that couples the master processor 217 to the IP network 218.

In accordance with some aspects, the communications management system 200 includes functionality that enables the physical layer information captured by the connector assemblies 202 to be used by application-layer functionality outside of the traditional physical-layer management application domain. For example, the management system 200 may include an aggregation point 220 that is communicatively coupled to the connector assemblies 202 via the IP network 218. The aggregation point 220 can be implemented on a standalone network node or can be integrated along with other network functionality.

The aggregation point 220 includes functionality that obtains physical layer information from the connector assemblies 202 (and other devices) and stores the physical layer information in a data store. The aggregation point 220 also can be used to obtain other types of physical layer information. For example, this information can be provided to the aggregation point 220, for example, by manually entering such information into a file (e.g., a spreadsheet) and then uploading the file to the aggregation point 220 (e.g., using a web browser) in connection with the initial installation of each of the various items. Such information can also, for example, be directly entered using a user interface provided by the aggregation point 220 (e.g., using a web browser).

The management system 200 also may include the tracking arrangement 110 of FIG. 1 or components thereof. Accordingly, the strength of the optical signal arriving at the optical module 120 may be one type of physical layer information communicated over the data system and stored at the aggregation point 220.

The management system 200 may also include a network management system (NMS) 230 includes PLI functionality 232 that is configured to retrieve physical layer information from the aggregation point 220 and provide it to the other parts of the NMS 230 for use thereby. The NMS 230 uses the retrieved physical layer information to perform one or more network management functions. In certain implementations, the NMS 230 communicates with the aggregation point 220 over the IP network 218. In other implementations, the NMS 230 may be directly connected to the aggregation point 220.

An application 234 executing on a computer 236 also can use the API implemented by the aggregation point 220 to access the PLI information maintained by the aggregation point 220 (e.g., to retrieve such information from the aggregation point 220 and/or to supply such information to the aggregation point 220). The computer 236 is coupled to the IP network 218 and accesses the aggregation point 220 over the IP network 218. For example, one example application 234 may calculate a decay rate for the optical network in the region of one of the optical modules 120, 320. Another example application 234 may determine when an optical signal has decayed beyond a predetermined threshold at one of the optical modules 120, 320.

One or more inter-networking devices 238 used to implement the IP network 218 include physical layer information (PLI) functionality 240. The PLI functionality 240 of the inter-networking device 238 is configured to retrieve physical layer information from the aggregation point 220 and use the retrieved physical layer information to perform one or more inter-networking functions. Examples of inter-networking functions include Layer 1, Layer 2, and Layer 3 (of the OSI model) inter-networking functions such as the routing, switching, repeating, bridging, and grooming of communication traffic that is received at the inter-networking device.

Additional details pertaining to example communications management system 200 can be found in U.S. application Ser. No. 13/025,841, filed Feb. 11, 2011, and titled "Managed Fiber Connectivity Systems," the disclosure of which is hereby incorporated herein by reference.

The above specification, examples and data provide a complete description of the manufacture and use of the composition of the invention. Modifications may be made to the components disclosed without deviating from the scope of the disclosure. For example, the tracking arrangement may be used with electrical systems by connecting watt meters or other such devices to electrical modules (e.g., using a physical layer management system). Since many implementations can be made without departing from the spirit and scope of the invention, the invention resides in the claims hereinafter appended.

What is claimed is:

1. An optical module through which optical signals are carried from at least one input line to a plurality of output lines, the optical module comprising:

a housing defining an interior, at least one input port at which the at least one input line is received, a plurality of output ports at which the output lines are received and from which the output lines are accessible from an exterior of the housing, and a single monitoring port that is separate from the input port and the output ports, wherein each output port is configured to read physical layer information from an optical connector plugged into the output port, wherein each output port is configured to direct the physical layer information to the single monitor port;

an optical power splitter arrangement disposed within the interior of the housing, the optical power splitter arrangement including at least one optical splitter, the optical power splitter arrangement being configured to split the optical signals received at the at least one input line onto the output lines and onto a plurality of monitoring lines;

at least one optical receiver arrangement disposed within the interior of the housing, the optical receiver arrangement being coupled to each of the monitoring lines, the optical receiver arrangement including at least one optical receiver, the optical receiver arrangement being configured to measure a power of optical signals received from the monitoring lines, the optical receiver arrangement also being configured to provide corresponding measurement signals to the single monitoring port of the housing; and a circuit board disposed within the housing, the circuit board electrically connecting the receiver arrangement to the single monitoring port of the housing so that the measurement signals are accessible from the exterior of the housing through the single monitoring port.

2. The optical module of claim 1, wherein no more than 20% of the power of the optical signals are split onto the monitoring lines.

3. The optical module of claim 2, wherein no more than 10% of the power of the optical signals are split onto the monitoring lines.

4. The optical module of claim 3, wherein no more than 5% of the power of the optical signals are split onto the monitoring lines.

5. The optical module, of claim 4, wherein no more than 2% of the power of the optical signals are split onto the monitoring lines.

6. The optical module of claim 1, wherein electrical power is supplied to the optical receiver arrangement through the single monitoring port.

7. The optical module of claim 1, wherein the at least one optical splitter is coupled to all of the output lines and all of the monitoring lines.

8. The optical module of claim 1, wherein the optical receiver arrangement includes a plurality of optical receivers, each of the optical receivers receiving optical signals from a respective one of the monitoring lines.

9. The optical module of claim 1, wherein the at least one optical receiver is coupled to all of the monitoring lines.

10. A method of monitoring power decay in an optical module configured to be coupled to a physical layer information (PLI) management network, the optical module including a splitter arrangement and an optical receiver arrangement disposed therein, the method comprising:

electrically connecting the optical receiver arrangement of the optical module to the PLI management network via a single monitoring port of the optical module;

splitting an optical signal received at an input of the optical module into a plurality output signals and a plurality of monitoring signals via the splitter arrangement;

directing the output signals to output ports of the optical module, each output port being configured to read physical layer information from an optical connector plugged into the output port, and each output port being configured to direct the physical layer information to the single monitor port;

obtaining from the optical receiver arrangement power measurement readings corresponding with the monitoring signals;

communicating the power measurement readings from the optical module to the PLI management network via the single monitoring port;

storing the power measurement readings in memory storage; and analyzing the power measurement readings to determine a decay rate.

11. The method of claim 10, wherein the power measurement readings are stored and/or analyzed at components disposed within the optical module.

12. An optical module through which optical signals are carried from at least one input line to a plurality of output lines, the optical module comprising:

a housing defining an interior, at least one input port at which the at least one input line is received, a plurality of output ports at which the output lines are received and from which the output lines are accessible front an exterior of the housing, and a single monitoring port that is separate from the input port and the output ports;

an optical power splitter arrangement disposed within the interior of the housing, the optical power splitter arrangement including at least one optical splitter, the optical power splitter arrangement being configured to split the optical signals received at the at least one input line onto the output lines and onto a plurality of monitoring lines, the optical power splitter arrangement includes a plurality of optical splitters, each of the optical splitters splitting optical signals onto a respective one of the output lines and a respective one of the monitoring lines;

at least one optical receiver arrangement disposed within the interior of the housing, the optical receiver arrangement being coupled to each of the monitoring lines, the optical receiver arrangement including at least one optical receiver, the optical receiver arrangement being configured to measure a power of optical signals received from the monitoring lines, the optical receiver arrangement also being configured to provide corresponding measurement signals to the single monitoring port of the housing; and a circuit board disposed within the housing, the circuit board electrically connecting the receiver arrangement to the single monitoring port of the housing so that the measurement signals are accessible from the exterior of the housing through the single monitoring port.

* * * * *

UNITED STATES PATENT AND TRADEMARK OFFICE
CERTIFICATE OF CORRECTION

PATENT NO. : 10,050,703 B2  
APPLICATION NO. : 14/976056  
DATED : August 14, 2018  
INVENTOR(S) : Trevor D. Smith Page 1 of 1

It is certified that error appears in the above-identified patent and that said Letters Patent is hereby corrected as shown below:

In the Claims

Column 11, Line 29, Claim 5: "optical module, of claim 4," should read --optical module of claim 4,--

Column 12, Line 26, Claim 12: "are accessible front an" should read --are accessible from an--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*